March 9, 1943.  A. GENEST ET AL  2,313,142
AUTOMATIC MULTIPLE OUTLET VALVE
Filed April 4, 1941
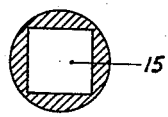
FIG. VI
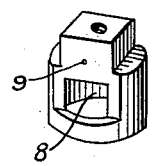
FIG. IX
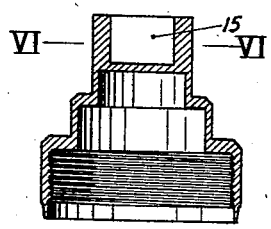
FIG. V
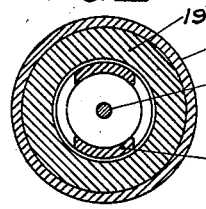
FIG. IV
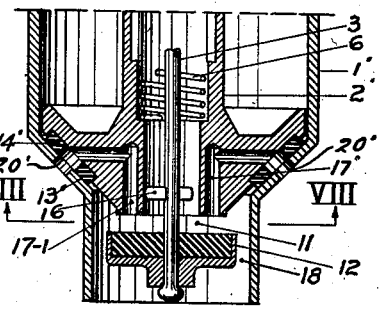
FIG. VII
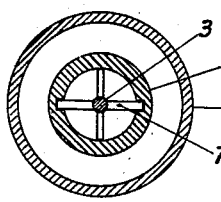
FIG. III
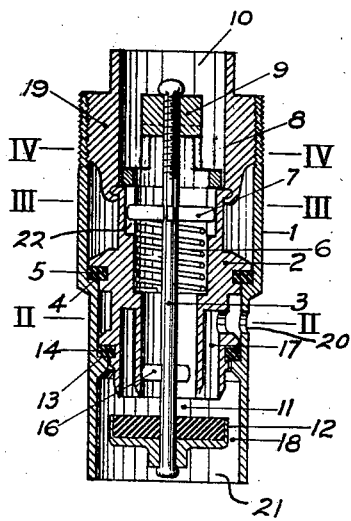
FIG. I
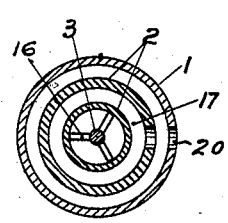
FIG. II
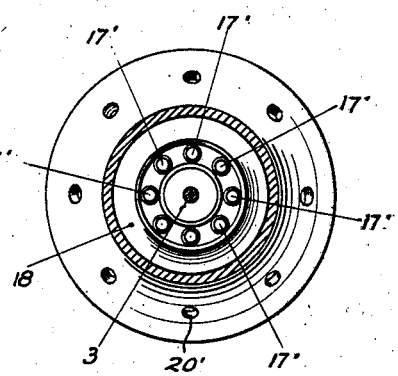
FIG. VIII
INVENTORS:
Aimé Genest.
Adrien Genest.

Patented Mar. 9, 1943

2,313,142

UNITED STATES PATENT OFFICE 2,313,142

AUTOMATIC MULTIPLE OUTLET VALVE

Aimé Genest and Adrien Genest, Montreal, Quebec, Canada

Application April 4, 1941, Serial No. 386,768

1 Claim. (Cl. 251—144)

The present invention pertains to a novel valve designed particularly to permit the admission of air, gas, or any liquid, or fluid, simultaneously into two or more separate reservoirs, tanks, or chambers, and to automatically shut off all outlets from the inlet and from one another.

The reservoirs, tanks or chambers to be filled can be separate, or inside one another.

The said valve is so constructed that it has a single inlet and as many outlets as the number of reservoirs to be filled. The opening of the valve by back pressure from any or all the reservoirs or from weakening of the spring and leaking at the valve seat, is prevented by a safety locking device.

Figure I is a longitudinal section through the axis of a valve used to supply two chambers; this figure shows valve open;

Figure II is a cross-section at the side outlet numbered 20 on Figure I;

Figure III is a cross-section through stem guides numbered 7 on Figure I;

Figure IV is a cross-section through the parts 8 (Fig. I) in the sides of the safety lock nut 9;

Figure V is an axial section of the valve cap;

Figure VI is a cross-section through the key top of the cap shown on Figure V;

Figure VII is a modified arrangement of Fig. I showing a valve used to supply a number of chambers 20';

Figure VIII is a view of the seat of valve shown on Figure VII;

Figure IX is a perspective view of the safety lock nut 9.

The device consists essentially of a tube 1 and a valve body 2 within tube 1 (Fig. I), leakage around the valve body being prevented by gaskets 5 and 14 which are pressed against their seats 4 and 13 by the screw head 19, which also withdraws the body from the tube when necessary. The annular space between the valve body 2 and tube 1 and between gaskets 5 and 14 permits the valve body to be replaced in the tube in any radial position without the necessity of aligning the outlet hole from 17 with outlet 20.

The screw head 19 is attached to valve body 2 in such a manner that 19 is free to rotate in relation to 2. At top of screw head 19 is the inlet designated 10 (Fig. I). At the opposite end of valve body 2, when the valve is open, is the space 11 common to the two annular passages 17 and 18 leading to outlets 20 and 21. A single obturator 12 closed by spring 6, automatically shuts off the passages 17 and 18 from the source of supply and from one another.

All outlets are supplied from space 11 situated between valve seat and obturator 12.

Obturator 12 is carried on stem 3 which is prevented from rotating by guide lugs 7 sliding in grooves 22 in the valve body 2, and from lateral displacement by guide lugs 7 and 16.

The safety lock nut 9, the upper part of which is threaded on the inlet end of stem 3, pulls the obturator 12 tightly to its seat, sealing it against leakage due to weakening of spring 6, minor defects on surface of obturator, or back pressure.

The lower part of safety lock nut 9 is cored out, having lateral ports as at 8 for passage of air, gas, liquid or fluid, from the inlet to the valve body 2.

The inlet 10 is covered with a screwed cap (Fig. V), the top of which provides a key 15 for operating the safety lock nut 9.

After the safety lock nut 9 has been unscrewed by the cap key 15, the air, gas, liquid or fluid, under pressure, enters at inlet 10, passes through ports 8 (Figs. I and IX) into the valve body 2, and, the obturator 12 being open by fluid pressure or otherwise, penetrates into the space 11 and reaches the independent reservoirs or chambers through outlets 20 and 21.

When the pressure is relieved from the inlet 10 (no other positive action being applied on stem 3), the valve automatically closes under the action of the spring 6. The chambers connected to outlets 20 and 21 are then automatically cut off from each other and from inlet 10 by the obturator 12.

The modifications illustrated in Figures VII and VIII are for valves of any number of outlets greater than two. The principle of operation is identical with the two outlet valve shown in Figure I.

In Figures VII and VIII, the chief structural difference is that outlets 20' have individual passages 17' alongside the inlet passage in the valve body 2', in place of the annular passage 17, Fig. I, with their seats arranged around the perimeter of the inlet seat. The body 2' is further modified to accommodate a single gasket 14' which is pierced with holes corresponding to the outlets 20'. This construction may be used for valves where balanced back pressure on the obturator is not required.

The following important features result from the construction shown in Figure I:

(a) The back pressure from any and all reservoirs is concentrically balanced around the stem irrespective of the relative back pressures from the reservoirs;

(b) The arrangement of the locking device which prevents the possibility of leakage between reservoirs as well as leakage from the main inlet;

(c) The valve body can be withdrawn from the inlet end of the tube, facilitating replacement;

(d) The proportion of the total volume of air, gas, liquid or fluid admitted to each of the reservoirs can be predetermined by the relative areas of the outlets.

Although specific embodiments of our invention have been illustrated and described, it is to be understood that various alterations in the details of the construction may be made without departing from the spirit or scope of our invention as indicated by the appended claim.

Having thus fully described our invention, what we claim and desire to secure by Letters Patent is:

A multiple outlet valve comprising a hollow, open ended cylindrical casing having a plurality of inwardly extending shoulders, a valve assembly mounted within the casing, said assembly comprising an open ended tubular seat member having a plurality of washers thereon for sealing engagement with said shoulders, the tubular member being spaced from the portion of the inner wall of the casing between the shoulders to provide an annular chamber, an outlet opening through the said casing wall portion, a second annular chamber in one end of said tubular member concentrically arranged within said first chamber and having one end open, a port in a wall of the second chamber providing communication between the two chambers, the inner wall of said second annular chamber defining an outlet for the passage through the tubular seat member, a spring pressed valve member normally closing the said open end of the second annular chamber and the outlet of the tubular seat member.

AIMÉ GENEST.
ADRIEN GENEST.